(12) United States Patent
Thebes et al.

(10) Patent No.: US 7,810,071 B2
(45) Date of Patent: Oct. 5, 2010

(54) AUTOMATED ERROR ANALYSIS

(75) Inventors: Martin Thebes, Heidelberg (DE); Tobias Scheuer, Bruchsal (DE); Andrei Suvernev, Palo Alto, CA (US); Jan Wedel, Rauenberg (DE)

(73) Assignee: SAP AG, Walldorf (DE)

( * ) Notice: Subject to any disclaimer, the term of this patent is extended or adjusted under 35 U.S.C. 154(b) by 1113 days.

(21) Appl. No.: 11/489,417

(22) Filed: Jul. 18, 2006

(65) Prior Publication Data

US 2008/0052680 A1 Feb. 28, 2008

(51) Int. Cl.
*G06F 9/44* (2006.01)
*G06F 11/00* (2006.01)

(52) U.S. Cl. ............ 717/124; 717/127; 717/128; 717/131; 714/47; 714/48; 714/38

(58) Field of Classification Search .......... 717/124
See application file for complete search history.

(56) References Cited

U.S. PATENT DOCUMENTS

| | | | |
|---|---|---|---|
| 5,410,685 A * | 4/1995 | Banda et al. | 714/38 |
| 5,581,697 A * | 12/1996 | Gramlich et al. | 714/35 |
| 6,438,749 B1 * | 8/2002 | Chamberlain | 717/174 |
| 6,658,656 B1 * | 12/2003 | Thompson | 717/151 |
| 6,802,054 B2 * | 10/2004 | Faraj | 717/128 |
| 7,386,839 B1 * | 6/2008 | Golender et al. | 717/131 |
| 7,559,060 B2 * | 7/2009 | Schmidt et al. | 718/100 |

* cited by examiner

*Primary Examiner*—Thomas K Pham
(74) *Attorney, Agent, or Firm*—Mintz, Levin, Cohn, Ferris, Glovsky and Popeo, P.C.

(57) ABSTRACT

During execution of a program, an error is detected which results in the program reverting to a predefined state prior to the detected error. In some variations, the predefined state is a rollback point. Thereafter, one or more analysis tools are automatically activated that can characterize performance of the program and the execution of the program is recommenced until the error is detected. The analysis tools can then provide information useful for analyzing the cause of the error such as a trace log.

18 Claims, 1 Drawing Sheet

AUTOMATED ERROR ANALYSIS

TECHNICAL FIELD

The subject matter described herein relates to the automatic detection and characterization of error conditions occurring in computer programs such as database applications.

BACKGROUND

Transformations within a system or subsystem (collectively referred to as "system") that are initiated by some action ("processing") can often result in significant differences within such a system. Processing in a system can be characterized as the step-by-step changing of states and parts of the current state (collectively referred to as "effects"). Certain effects may only be transient in nature and difficult to observe. As a result, historical state information is often required when diagnosing a subsequent error condition or evaluating unexpected behavior.

SUMMARY

After errors are detected during execution of a program, the program is automatically reverted to a predefined state (e.g., a rollback point, etc.) that is prior to the detected error. At or about the same time, one or more analysis tools (e.g., tracing tools, debuggers, etc.) that can characterize performance of the program are activated. Execution of the program is recommenced from the predefined state until the error is detected or later. The results of the analysis tools can be later used for diagnosing the cause of the error. In some variations, a log is generated which can be automatically analyzed for diagnostic purposes or it can be sent or otherwise conveyed to a user (e.g., graphically displayed, etc.).

In an interrelated aspect, an exception is detected during execution of a program. Subsequently, the program is reverted to a predefined state prior to the detected exception. In addition, one or more analysis tools are activated that characterize performance of the program. Once the analysis tools are activated, execution of the program is recommenced from the predefined state until at the least the exception is detected in order to obtain contextual diagnostic information relating to the exception.

In a further interrelated aspect, an error is detected during execution of a database application. After the error is detected, changes to the database are reverted back to a predefined state that occurred prior to the detected error. In addition, internal states of the database are changed to a predetermined settings. Diagnostic tools are activated to characterize performance of the application and application code is called staring from the predefined state until the error is detected or later.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, the techniques described herein enable automated and configured error analysis. Moreover, the current subject matter may allow for on-demand self-explanation of systems (e.g., running software).

The details of one or more variations of the subject matter described herein are set forth in the accompanying drawings and the description below. Other features and advantages of the subject matter described herein will be apparent from the description and drawings, and from the claims.

DETAILED DESCRIPTION

When an error occurs within a method, the method can create an object and hand it off to the runtime system. The object, called an exception object, contains information about the error, including its type and the state of the program when the error occurred. Creating an exception object and handing it to the runtime system is called throwing an exception.

After a method throws an exception, the runtime system attempts to find a method to handle it. The runtime system searches the call stack for a method that contains a block of code that can handle the exception. This block of code is called an exception handler. The search begins with the method in which the error occurred and proceeds through the call stack in the reverse order in which the methods were called. When an appropriate handler is found, the runtime system passes the exception to the handler. The subject matter described herein can be utilized to automatically diagnose the reasons why an error was created (and a resulting exception was thrown).

Figure 1:
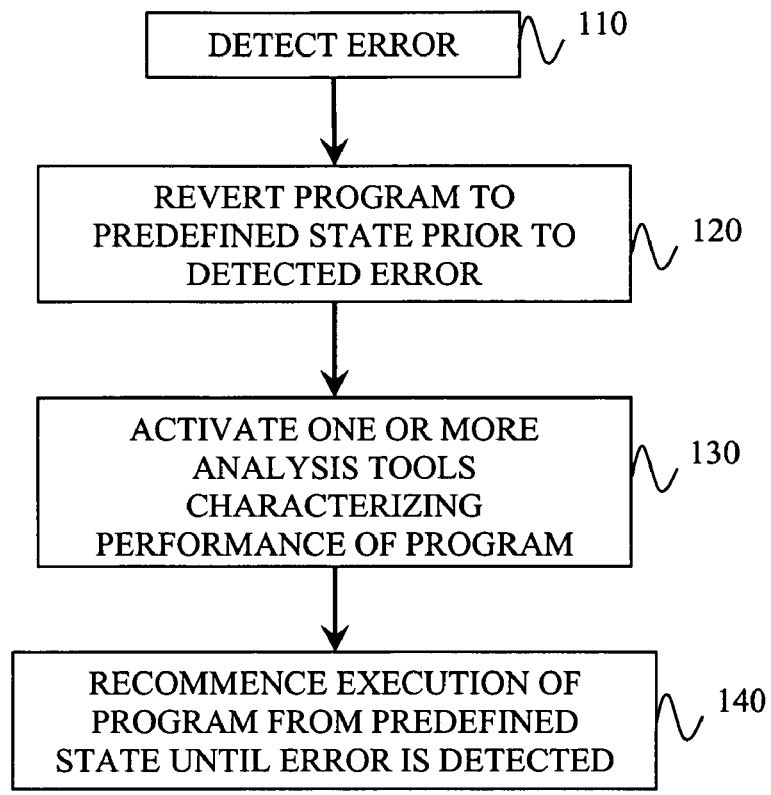
FIG. 1 is a process flow diagram illustrating a repetitive analysis of a system as a conditional post-processing step.

FIG. 1 is a process flow diagram illustrating a method 100 in which, at 110, an error is detected during execution of a program. After the error is detected, at 120, the program is automatically reverted to a predefined state prior to the detected error. Prior to the recommencement of the program, at 130, one or more analysis tools that characterize performance of the program are activated. Thereafter, at 140, execution of the program is recommenced from the predefined state at least until the error is detected. The output of the analysis tools can later be used to characterize the reason for the error.

Figure 2:
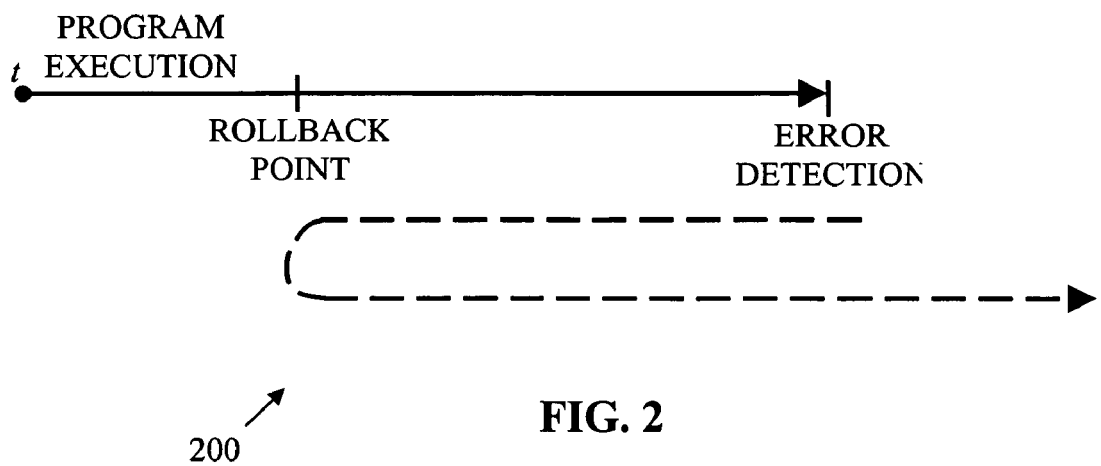
FIG. 2 is a timeline illustrating repetitive analysis as shown in FIG. 1.

FIG. 2 is a timeline 200 that provides further illustration regarding the execution of a program. As shown, the execution of an application proceeds past a rollback point until an error is detected. Thereafter, the program reverts to a state corresponding to the rollback point upon which one or more analysis tools are initiated until an error is detected. In some variations, the trigger for initiating and reverting the state can be the throwing of an exception rather than the error itself.

Error detection methods can be hard coded at predetermined places in source code where errors can be efficiently checked. Error detection is application specific and so error detection must be addressed in detail for any application. An example of such an error check can be triggered after leaving a module so that it is determined whether actions relating to the module have been cleaned after the module has finished, e.g. allocating memory, etc. A related error check could determine if a related list is empty, and an exception would be initiated if the list (which is required to be empty) is not empty.

Rollback points can be hard coded into the source code. From experience, or from analysis of typical program flow, the programmer can identify which places are best suited to define rollback points. Typically, rollback points can be placed at entry points into modules or subsystems, but technically there are few limits to where rollback points can be placed. In C++, rollback points can be set at places which also do exception handling. In some variations, the rollback point is placed where the exception is caught and handled. Once an exception is caught (or all suitable exceptions—not all exception can be handled), the code which was executed after the rollback point is again executed, but with something changed, namely, that additional tracing or other analysis tools can be enabled. In one variation, all code to be executed after the rollback point is put into one function call, which is then called again for diagnostic purposes.

The results of the analysis tool (e.g., tracing tool, debugger, etc.), can be provided to a user and/or another agent. The result may be a log with the results of the trace or any other information that might be of use in diagnosing the cause of the error/exception. For example, not only can the log characterize system state information at the time the error was detected, but the log can also characterize what the program did to reach the state.

In one variation, the subject matter described herein is implemented in connection with a database application. With such an arrangement, an error occurs in the database application which results in certain database changes being reverted ("rolled back") and internal states are reset to settings at the time the rollback point was set. Thereafter, the application code can be called again in the same fashion as before, but with analysis tools enabled. The analysis tools can include tracing tools, run-time check methods, and/or debugging tools. If the error is reproduced, the diagnosis tools can be configured to provide a log detailing contextual information that can be used to determine the cause of the error.

The states of the database application can be determined by taking a memento of all objects (or states) at the time when the rollback point is taken. A memento pattern is a software design pattern that provides the ability to restore an object to its previous state (undo by rollback). This way, objects can be restored to the state they had when the rollback point was taken. Objects which were created after the rollback point may be simply deleted (as there is no memento for those objects). In some implementations, objects (or states) can be completely deduced from other objects (e.g., meta data, etc.), for those kind of objects the memento can be stored as described above, or the meta data can be invalidated and necessary re-computations processed.

In another variation, a user in a planning system would like to characterize state information associated with a planning object (such as a date entry). The user can replay his or her planning actions while tracking changes of certain states for relevant planning objects. For example, a user might move an order on his or her planning board. This change is communicated to a back-end processor system which returns new times and values for the requested order and possibly other related orders as well. Now, this is very similar to a function call between modules, and as a result, a rollback point is set after the entry of the function performing the computations. This rollback point is used whenever the user would like to revert the state of the planning object to some prior point.

In yet another variation, all of the user interface events for a planning system may be recorded (i.e., record all keystrokes, mouse movements, clicking, etc.). With this arrangement, a memento can be a specific point in that list of events (list as these events occur sequentially), and the computer could then replay the events as the user has made them just to the rollback point, or starting from the rollback point once again.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a non-transitory machine-readable medium embodying instructions that when performed by one or more machines result in operations comprising:

recording all user interface events associated with a program for a planning system, the program rendering a graphical user interface through which a user replays planning actions while tracking changes of certain states for relevant planning objects;

detecting an error during execution of the program;

automatically reverting the program to a predefined state prior to the detected error;

automatically activating one or more analysis tools characterizing performance of the program; and automatically recommencing execution of the program from the predefined state by replaying the recorded user interface events made by the user from either up to the predefined state or at the predefined state until at least the error is detected while the one or more analysis tools remain active.

2. An article as in claim 1, wherein the predefined state is characterized by a rollback point.

3. An article as in claim 1, further comprising instructions that result in operations comprising: generating, by the one or more analysis tools, a log characterizing the performance of the program.

4. An article as in claim 3, further comprising instructions that result in operations comprising: visually displaying the log to a user.

5. An article as in claim 3, further comprising instructions that result in operations comprising: sending the log to a remote user via a computer network.

6. An article as in claim 1, wherein the one or more analysis tools comprises a tracing tool.

7. An article as in claim 1, wherein the one or more analysis tools comprises a debugger.

8. An article comprising a non-transitory machine-readable medium embodying instructions that when performed by one or more machines result in operations comprising:

recording all user interface events associated with a program for a planning system, the program rendering a graphical user interface through which a user replays planning actions while tracking changes of certain states for relevant planning objects;

detecting an exception during execution of the program;

automatically reverting the program to a predefined state prior to the detected exception;

automatically activating one or more analysis tools characterizing performance of the program; and automatically recommencing execution of the program from the predefined state by replaying the recorded user interface events made by the user from either up to the predefined state or at the predefined state while the one or more analysis tools remain active.

9. An article as in claim 8, wherein the predefined state is characterized by a rollback point.

10. An article as in claim 8, further comprising instructions that result in operations comprising: generating, by the one or more analysis tools, a log characterizing the performance of the program.

11. An article as in claim 10, further comprising instructions that result in operations comprising: visually displaying the log to a user.

12. An article as in claim 10, further comprising instructions that result in operations comprising: sending the log to a remote user via a computer network.

13. An article as in claim 8, wherein the one or more analysis tools comprises a tracing tool.

14. An article as in claim 8, wherein the one or more analysis tools comprises a debugger.

15. An article comprising a non-transitory machine-readable medium embodying instructions that when performed by one or more machines result in operations comprising:

taking a memento of all states of a database application when each of a plurality of rollback points in the database application are taken;

automatically detecting an error during execution of the database application;

automatically reverting database changes in the application to a rollback point prior to the detected error based on the corresponding memento taken at such rollback point;

automatically resetting internal states of the database application to predetermined settings;

automatically activating one or more diagnostic tools characterizing performance of the application; and automatically calling application code starting from the rollback point until at least the error is detected while the one or more diagnostic tools remain active.

16. An article as in claim 15, wherein the one or more diagnostic tools comprises a tracing tool.

17. An article as in claim 16, further comprising instructions that result in operations comprising: generating, by the tracing tools, a log characterizing the performance of the program.

18. An article as in claim 17, further comprising instructions that result in operations comprising: automatically sending the log to a remote user via a computer network.

* * * * *